United States Patent [19]

Binns

[11] Patent Number: 4,968,198
[45] Date of Patent: Nov. 6, 1990

[54] BUCKLING SLEEVE BLIND FASTENER

[76] Inventor: Lloyd S. Binns, 349 Oakheath Dr., Harbor City, Calif. 90710

[21] Appl. No.: 54,339

[22] Filed: May 26, 1987

[51] Int. Cl.$^5$ ............................................. F16B 13/04
[52] U.S. Cl. ........................................ 411/38; 411/43; 411/55; 411/65
[58] Field of Search ................... 411/38, 43, 55, 34, 411/35, 36, 37, 70, 54, 44, 63, 65

[56] References Cited

U.S. PATENT DOCUMENTS

| | | | |
|---|---|---|---|
| 2,887,003 | 5/1959 | Brilmyer | 411/34 |
| 4,312,613 | 1/1982 | Binns | 411/34 |
| 4,364,697 | 12/1982 | Binns | 411/38 |
| 4,457,652 | 7/1984 | Pratt | 411/38 |
| 4,778,318 | 10/1988 | Jeal | 411/43 |
| 4,815,906 | 3/1989 | Binns | 411/38 |

Primary Examiner—Rodney M. Lindsey
Attorney, Agent, or Firm—Donald D. Mon

[57] ABSTRACT

A blind fastener is disclosed. The fastener comprises a tubular nut, a buckling sleeve and a mandrel. The buckling sleeve on one of its ends has a bearing face radially overhanging a facing restraint face of the tubular nut, and a tapered surface which deforms upon threaded drawing of the mandrel through the nut to approach the shape of a plane normal to the axis of the fastener.

9 Claims, 2 Drawing Sheets

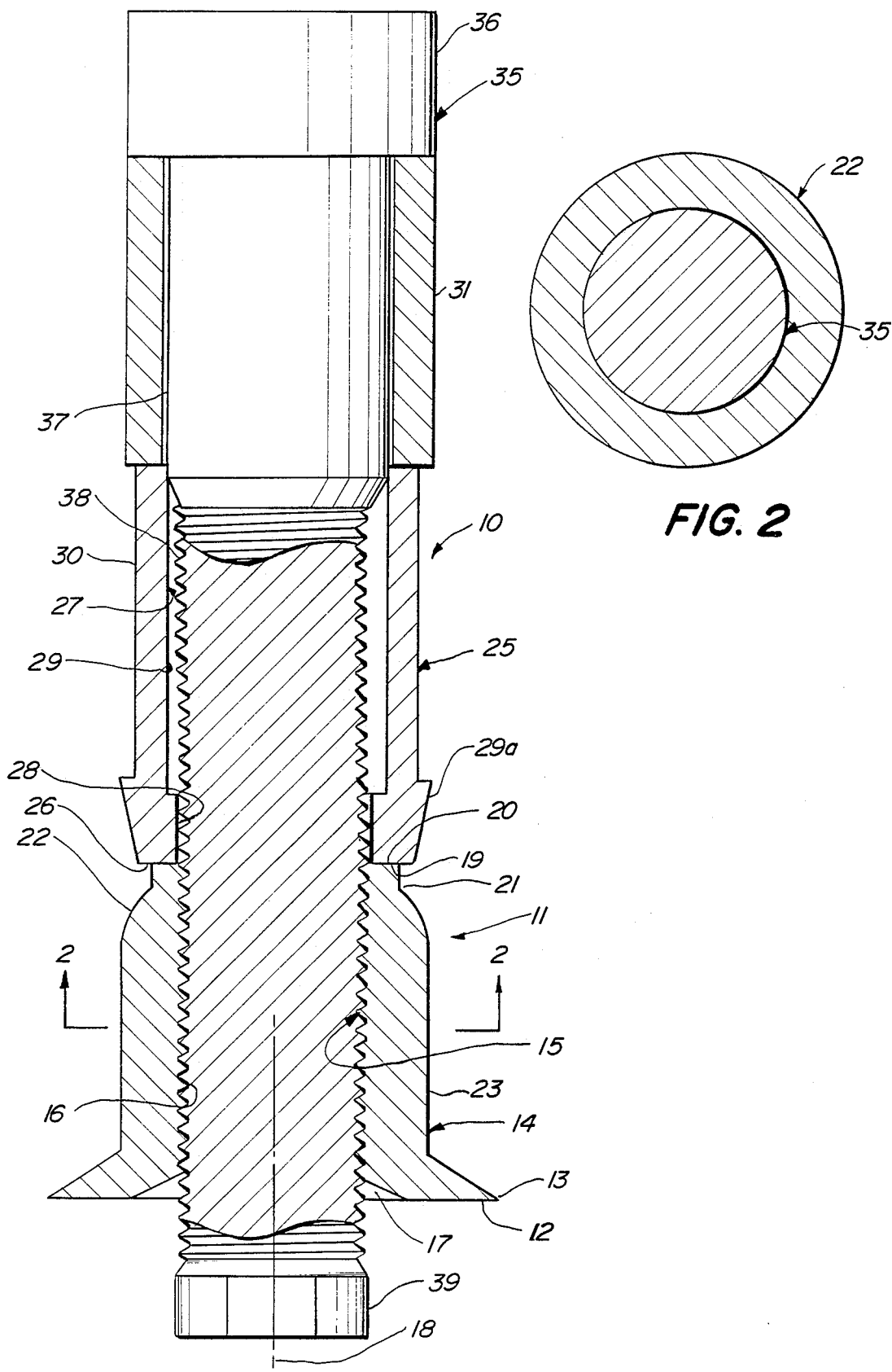

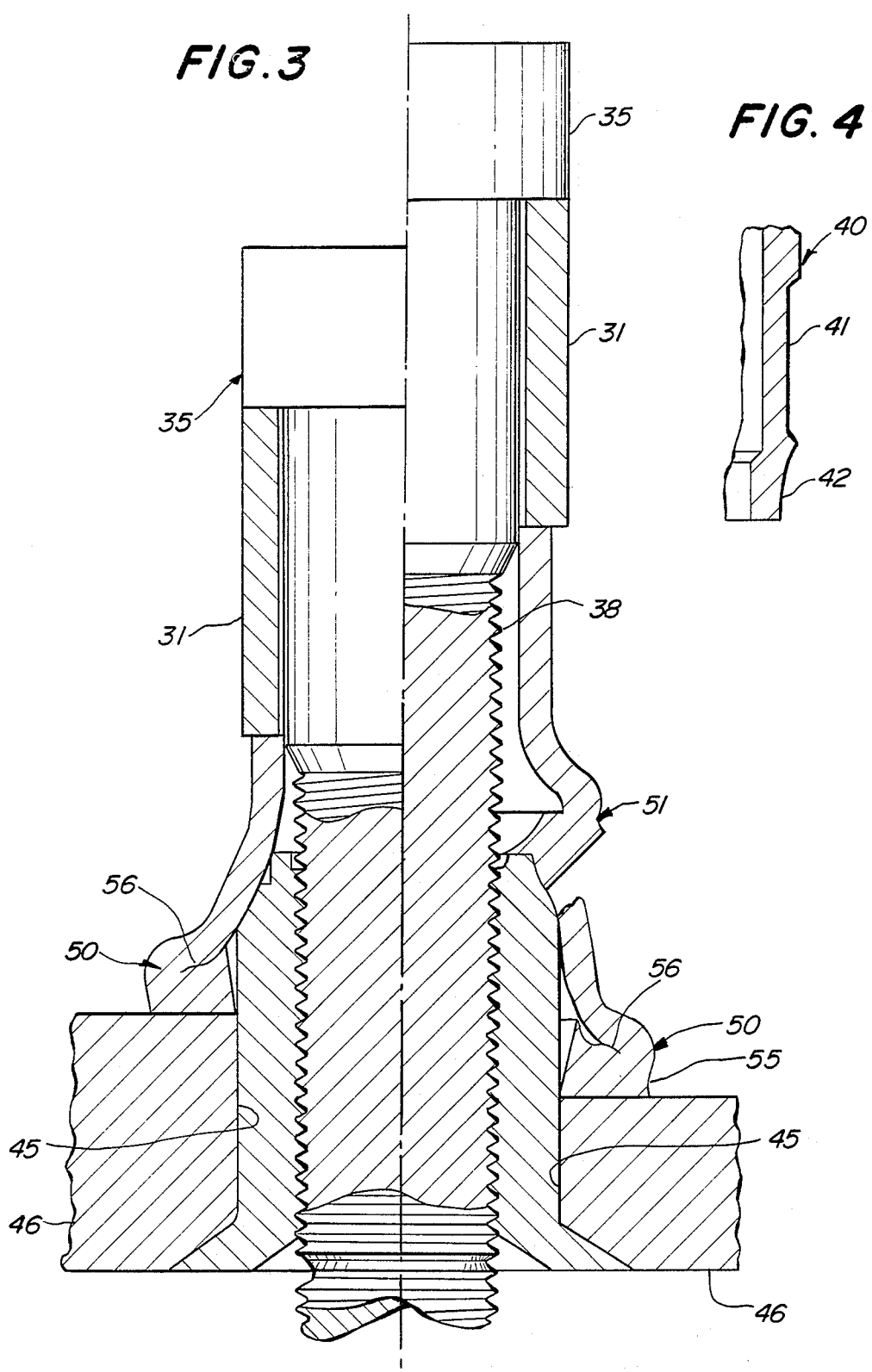

BUCKLING SLEEVE BLIND FASTENER

FIELD OF THE INVENTION

This invention relates to blind fasteners, that is, to fasteners which can be installed by operations conducted at only one side of the work, and in particular to the type which utilizes a buckling tube to form a head at the blind side of the work.

BACKGROUND OF THE INVENTION

Blind fasteners which are installed by operations conducted at only one side of the work are in widespread usage. In some types, a tubular sleeve is pulled over a tapered nose piece to enlarge its diameter and thereby form a retaining head. An example of this type of fastener is shown in Wing and Schuster U.S. Pat. No. 3,129,630.

This is a successful fastener, but has the disadvantage that the bearing area of the head is limited to the area of the end of the expanded sleeve. This results in relatively high unit loads on the workpiece which it abuts. This is fully satisfactory for most installations in metallic workpieces. However, when the workpiece is a composite material, the unit loading should be minimized, because composite materials are not optimally designed for this type of load. It would be preferable for the expanded head to have a larger "footprint".

In order to provide a larger footprint, a buckling type blind fastener was developed, which is exemplified by Wing U.S. Pat. No. 3,236,143. In this device, a circular tubular sleeve is put into compression between the workpiece and the head of a pull stem, and the tube is caused to fail in a buckling mode. This produces one or more tubular enlargements, one of which bears against the workpiece to retain the fastener. The problem inherent in this type of fastener is that much of the force required to buckle the sleeve is also applied to the workpiece, and this can also be a disadvantage when the fastener is to be set in composite materials, or in any material where applied localized compressive forces should be minimized.

Accordingly it is an object of this invention to provide a buckling sleeve blind fastener whose buckled head is formed principally by reactions with its own nut, and which is largely pre-formed before it reaches the workpiece. Thus, the forces required to form the buckled head are mostly isolated from the workpiece. Of course the pull-up forces needed to tension the fastener and clamp the work together will be applied to the workpiece, but through the type of enlarged head that can be provided by a buckled sleeve.

This invention will be fully understood from the following detailed description and the accompanying drawings, in which:

BRIEF DESCRIPTION OF THE DRAWINGS

FIG. 1 is an axial cross-section of the presently preferred embodiment of the invention;

FIG. 2 is a cross-section taken at line 2—2 in FIG. 1;

FIG. 3 is an axial cross-section of the installed fastener of FIG. 1, showing its minimum and maximum grip conditions: and FIG. 4 shows two useful localized improvements to the sleeve.

DETAILED DESCRIPTION OF THE INVENTION

A blind fastener 10 according to the invention is shown in FIG. 1. It is a circular construction intended to be installed in a circular hole through a workpiece. The primary element to withstand shear forces is a nut 11 having a head 12 at one end 13, a tubular shank 14, and a hole 15 from end to end with an internal thread 16 therein. Torque tool retaining slots 17 are formed in the head to enable the nut to be restrained against rotation in the hole. The fastener has a central axis 18.

At end 19, the nut is provided with a restraint face 20. This face may be a planar annular surface, or may be modified with teeth or other rotation resisting provisions if desired. A step 21 is formed at the outer edge of face 20. It is followed in sequence by a curved enlarging guide surface 22, which terminates at the cylindrical outer wall 23 of the nut.

A buckling sleeve 25 is tubular and coaxial with the nut. It has a bearing face 26 that is brought to bear against restraint face 20. It has a central passage 27 with a first axial section 28 of lesser diameter and a second axial section 29 of greater diameter. The bearing face extends radially outward beyond the restraint face, and overhangs the step. An external tapered surface 29a will ultimately provide the bearing surface of the buckled head. The outer wall 30 of the sleeve is cylindrical.

For some installations, it is useful to provide sleeve 25 of one material, and to provide a second sleeve 31 of another material which need not buckle. Sleeve 31 is optional.

A mandrel 35 has a head 36 that bears against sleeve 31 when that sleeve is provided, or against sleeve 25 when sleeve 31 is not provided. The head overhangs the sleeves and when moved axially will exert the forces needed to install the fastener.

A shank 37 of the mandrel has an external thread 38 that is threaded into the nut. The shank projects beyond the head of the nut, and has torque tool engaging surfaces 39 such as wrenching flats to enable the mandrel to be turned, whereby to draw the head of the mandrel against the sleeve and exert buckling forces.

FIG. 4 shows a sleeve 40 in all respects identical to sleeve 25, except that a section 41 of reduced wall thickness is provided to facilitate the buckling action. This reduced section is optional.

FIG. 4 shows yet another optional feature. In FIG. 1, tapered surface 29a is shown as a straight frusto-conical taper. It is an objective of the invention to have this surface end up as a substantially flat annulus, bearing against a flat workpiece area. The transition from the tapered shape to a flat shape is the function of properties of material, and of the contour of various parts of the sleeve. As shown in FIG. 4, surface 42 may be provided which is not a straight taper, but rather which has a concave surface that in some fasteners may be more amenable to flattening out. This will be a gently concaved surface of revolution, whose shape will best and conveniently be determined by trial and error when the other design parameters are known, such as strength and ductility of the material, and the various dimensions. Surface 42 can be substituted for surface 29a, and can be used independently of reduced section 41. The concavity need not extend for the full length of the tapered surface which ultimately will abut the workpiece, but it will usually be preferred, when used. That portion of the tapered surface which is to be concave, will ordinarily be located adjacent to the bearing surface in the unset fastener.

The installation of the fastener is completely conventional. In its unset condition it is fitted in hole 45 in a workpiece 46. In FIG. 3, the maximum grip condition is shown on the left, and the minimum grip condition on the right. This is to say that a given fastener can be installed in workpieces in a range of thicknesses from the minimum thickness shown on the right to the maximum thickness shown on the left. The buckled head 50 is shown contiguous to the workpiece on both sides. It is substantially identical throughout the grip range.

FIG. 3 shows two steps in the installation of the fastener. The first step is shown at 51, where the eccentric forces resulting from the overhang of the bearing face have caused the inside edge of it to be retained on the bearing face which the outside portion has rotated to form a bulge. Thereafter, the bearing face, now a frustum-shaped surface, moves along guide surface 22 and then along the outer wall of the nut. As shown at the left side in FIG. 3, and by vignette 55 on the right side, there is a folding action at 56, and finally what was tapered surface 29a now bears directly against the workpiece.

It is important to notice that the folding and bulging action was largely completed before the sleeve reached the workpiece. Thereafter there were only required small additional deformations to make a good surface-to-surface contact and the pull-up forces to draw it against the work.

If desired, a torque-off groove 58 can be formed in the stem to facilitate removal of the projecting portion of the mandrel after installation. Instead it may merely be clipped off.

The reduced section 41 shown in FIG. 4 can facilitate the bulging deformation of the tube.

The integrity of the installed fastener depends on the mandrel's remaining in the sleeve. While thread-locking means need not necessarily be provided to prevent the mandrel from unthreading out of the sleeve, it will often be advantageous to provide them. Thread locking provisions for this purpose are known. For example, an external dimple may be indented into the wall of the nut so as locally to distort the thread inside the nut. This causes a drag on the thread that tends to restrain it against unthreading.

This invention provides a buckling type fastener wherein the large buckled head is substantially formed before it reaches the workpiece. It thereby provides a large area footprint without requiring reaction with the workpiece to form the buckled head.

This invention is not to be limited by the embodiments shown in the drawings and described in the description, which are given by way of example and not of limitation, but only in accordance with the scope of the appended claims.

I claim:

1. A blind fastener comprising:
 - a tubular nut with a central axis and an axial hole extending from end to end thereof, an internal thread in the wall of said hole, a head at one end, and a restraint face at the other, said nut also including a cylindrical outer wall, a peripheral, curved guide surface and a step adjacent to said restraint face, said curved guide surface extending between said step and said cylindrical outer wall:
 - a tubular buckling sleeve having a central axis and an axial passage therethrough, said sleeve having an inner wall, an outer wall, a first end and a second end, and on said first of its ends facing and contiguous to said restraint face, a bearing face, said bearing face at least partially covering said restraint face and also radially overhanging it, and as a part of its said outer wall said sleeve having a tapered surface; and
 - a mandrel including a shank extending through said buckling sleeve and said nut, with a clearance between itself and said inner wall, and having an external thread engaged with the internal thread in the nut, said mandrel further including a head bearing against said second end of said sleeve;
 - whereby when said mandrel is threadedly drawn through said nut in a tightening direction of rotation, the head of the mandrel presses said faces together and causes a buckling of said sleeve adjacent to said first end of said sleeve so that said tapered surface deforms to approach the shape of a plane normal to said axis, and as the mandrel is further turned, said bearing face deforms to move along said guide surface and said cylindrical outer wall of said nut, so that said sleeve in a buckled condition is brought toward and against a workpiece in which said nut is fitted.

2. A blind fastener according to claim 1 in which said guide surface is convexly curved.

3. A blind fastener according to claim 2 in which said step is generally cylindrical.

4. A blind fastener according to claim 1 in which said sleeve is divided into two tubular parts which abut one another.

5. A blind fastener according to claim 1 in which thread lock means resists rotation of the mandrel in the nut in the direction said tightening direction of rotation tightening direction of rotation.

6. A blind fastener according to claim 5 in which said thread lock means comprises a distortion in the thread in the nut.

7. A blind fastener according to claim 1 in which at least a portion of said tapered surface is a concave surface of revolution.

8. A blind fastener according to claim 7 in which said portion is adjacent to said bearing face.

9. A blind fastener according to claim 8 in which said concave surface of revolution occupies substantially the entire axial length of said tapered surface.

* * * * *